United States Patent [19]

Runco

[11] 4,403,815
[45] Sep. 13, 1983

[54] KNOCK DOWN PROJECTION TELEVISION CABINET

[76] Inventor: Virgil S. Runco, 878 Wharf Side, San Mateo, Calif. 94402

[21] Appl. No.: 224,305

[22] Filed: Jan. 12, 1981

[51] Int. Cl.³ .................. A47B 81/06; H04N 5/74
[52] U.S. Cl. .................................. 312/7.2; 312/111; 358/237
[58] Field of Search ............... 312/7.1, 7.2, 140, 111; 248/449; 358/237, 238, 257

[56] References Cited

U.S. PATENT DOCUMENTS

| | | | |
|---|---|---|---|
| 3,194,619 | 7/1965 | Dannenberg | 312/7.2 |
| 3,198,475 | 8/1965 | Flahive | 248/449 |
| 3,205,772 | 9/1965 | Guske | 248/449 |
| 3,731,956 | 5/1973 | Hanley | 312/111 |
| 3,848,942 | 11/1974 | Fanini | 312/111 |
| 3,857,619 | 12/1974 | Adickes | 312/111 |
| 3,943,282 | 3/1976 | Muntz | 358/238 |
| 4,058,837 | 11/1977 | Muntz | 358/237 |
| 4,074,322 | 2/1978 | Cammilleri | 358/237 |
| 4,209,807 | 6/1980 | Arita | 312/7.2 |

*Primary Examiner*—Victor N. Sakran
*Attorney, Agent, or Firm*—Paul L. Hickman

[57] ABSTRACT

A knock down projection television cabinet is disclosed which can be quickly and easily assembled from individual flat panels and which can be just as easily disassembled for shipping and storage. The cabinet includes base, side, front and top panel members which define the basic box of the cabinet. Within the box a support panel member correctly positions a standard portable television which serves as an image source. A pair of panel members in the front of the cabinet form a hinged drawer which can hide and protect the projection optics. All of the panel members are held together by knock down type fasteners and thus require no tools for assembly.

12 Claims, 15 Drawing Figures

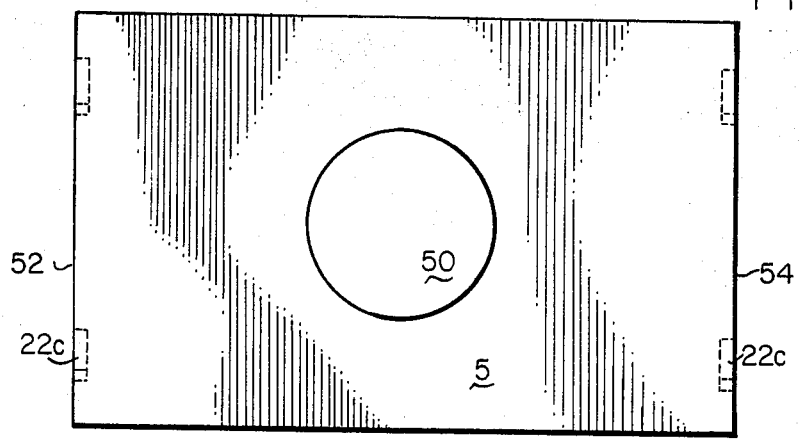
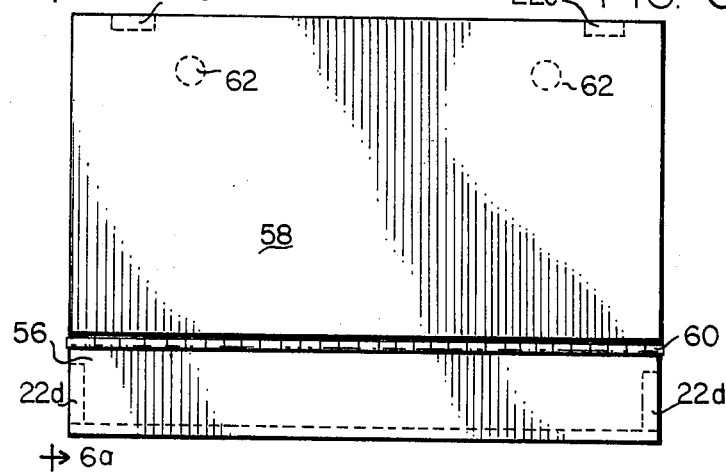
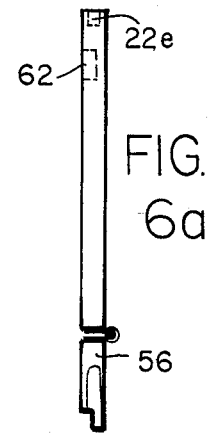
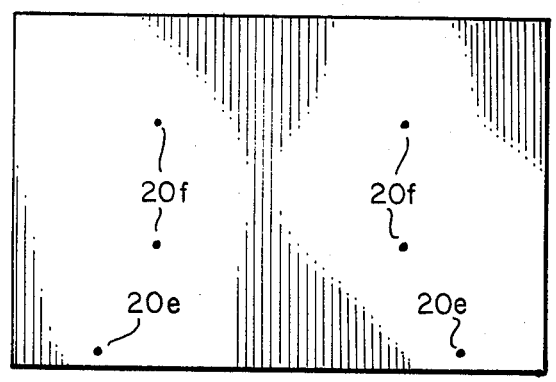

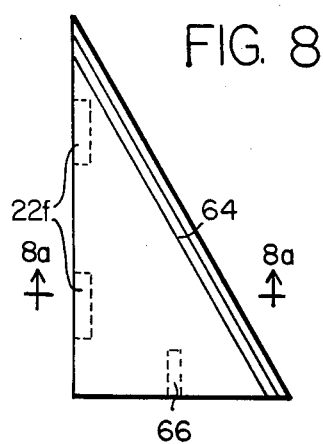
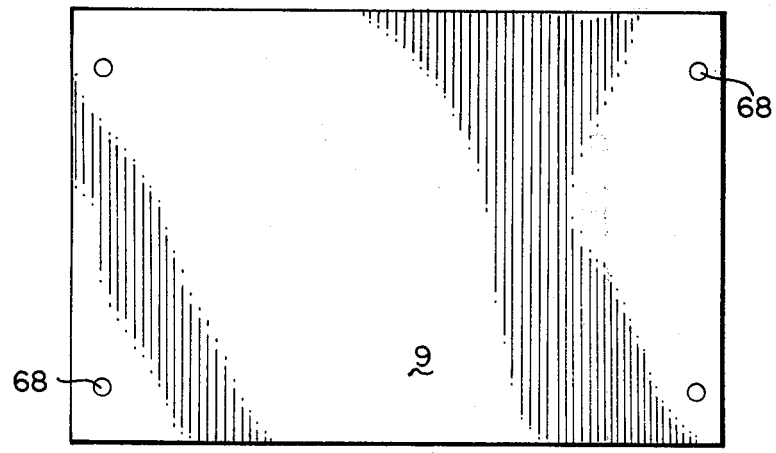
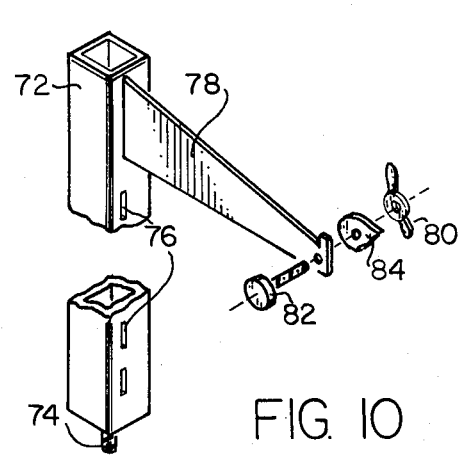
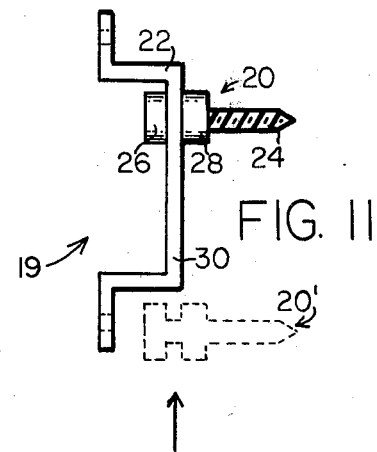

KNOCK DOWN PROJECTION TELEVISION CABINET

BACKGROUND OF THE INVENTION

1. Field of the Invention

This invention relates generally to television receivers and more particularly to large screen, projection type television systems.

2. Description of the Prior Art

Projection, or large screen, television has been around for many years. A reason behind the interest in large screen television is that many people feel that a conventional television picture, usually measuring no more than 25 inches on the diagonal, is simply not large enough for truly enjoyable viewing, and would prefer a projection television system having a viewing screen size ranging upwardly from 40 inches on the diagonal.

There are at least three systems in current use which project a large television image upon a screen. The first, and technologically least complicated, system utilizes a lens system to magnify the image produced by a standard television C.R.T. and to project the magnified image upon a viewing screen. Examples of such systems are found in the disclosures of E. Muntz in U.S. Pat. Nos. 3,943,282 and 4,058,837 and of A. Cammilleri in U.S. Pat. No. 4,074,322. Projection televisions of this type have the advantage of being considerably less expensive than other types of projection television systems.

A second type of projection television system utilizes three separate nonstandard C.R.T.'s to produce a relatively bright image upon a viewing screen. Systems such as these have a red tube, a green tube and a blue tube to project separate red, green and blue images which merge together into a single color image at the viewing screen.

While three-tube systems produce a brighter image than the lens and standard C.R.T. systems, they are also considerably more expensive. Furthermore, three-tube systems often require the unit housing the three nonstandard C.R.T.'s to be separated from the viewing screen by a considerable distance.

Thirdly, there is an oil-film type of television projection system which utilizes a thin, transluscent film of oil capable of creating a television image. Extremely high intensity colored lights are directed through the oil films to produce a superbright television image upon a viewing screen. Oil-film projection televisions are extremely expensive, often costing many tens of thousands of dollars, and are usually reserved for large scale applications such as as within football stadiums or large municipal auditoriums.

Thus, for home use, a consumer is usually economically constrained to the purchase of one of the first two mentioned type of systems. Unfortunately, even these less expensive systems can cost thousands of dollars. A problem the prior art apparently has not addressed is how to produce an attractive, inexpensive large screen television system capable of producing a high quality picture.

A further problem that the prior art has not addressed is how to efficiently store and ship a large screen television system. A review of the prior art finds that large screen televisions almost universally include bulky, hard to ship cabinets.

Inexpensive large screen television systems could also be useful for business purposes. For example, persons or organizations who put on seminars or who participate in trade shows could make use of the graphic cababilities of a large screen system in their presentation. To be truly useful, however, the system would have to be easily and quickly assemblable and disassemblable so that it could be shipped, handled, stored and moved with a minimum of effort. No known large screen system meets these requirements.

SUMMARY OF THE INVENTION

An object of this invention is to provide a high quality yet inexpensive projection television system.

Another object of this invention is to provide a projection television cabinet that can be easily and efficiently stored and shipped.

Yet another object of this invention is to provide a projection television cabinet that can be quickly assembled and disassembled.

Briefly, the invention includes a projection television cabinet constructed of a number of individual, flat panel members, a lens assembly, a mirror assembly, a front projection type screen, and a screen support assembly. The panels are all provided with knock down type fasteners which allow the panels to be quickly assembled into a projection television cabinet and, should the need arise, to be just as quickly disassembled.

An economic advantage of this invention is that the cabinet is constructed from flat, standardized panels that can be inexpensively mass produced. The panels are primarily designed to easily attach together without tools and thus comprise an ideal projection television "kit" for the home consumer, at great labor cost savings.

This invention is also advantageous in that the cabinet is made of separable, flat panels allowing for very efficient storage and shipment when in its disassembled form. Further, the ease of assembly and disassembly of the cabinet makes the present invention well suited for the aforementioned business uses.

These and other objects and advantages of the present invention will no doubt become apparent upon a reading of the following descriptions and a study of the several figures of the drawing.

BRIEF DESCRIPTION OF THE DRAWING

FIG. 5 is an elevational view of the front panel member shown at 5 in FIG. 1.

FIG. 6 is an elevational view of the hinged panel member shown at 6 in FIG. 1.

FIG. 6a is a view taken along line 6a—6a of FIG. 6.

FIG. 7 is an elevational view of the drawer front panel shown at 7 in FIG. 1.

FIG. 8 is an elevational view of one of the mirror support panel members shown at 8 in FIG. 1.

FIG. 8a is a cross sectional view taken along line 8a—8a of FIG. 8.

FIG. 9 is a plan view of the support panel member shown at 9 in FIG. 1.

FIG. 10 is a partial perspective view of the screen support assembly.

FIG. 11 is an elevational view of a knock down type fastener used to removably attach the various panel members of this invention together.

DESCRIPTION OF THE PREFERRED EMBODIMENT(S)

Figure 1:
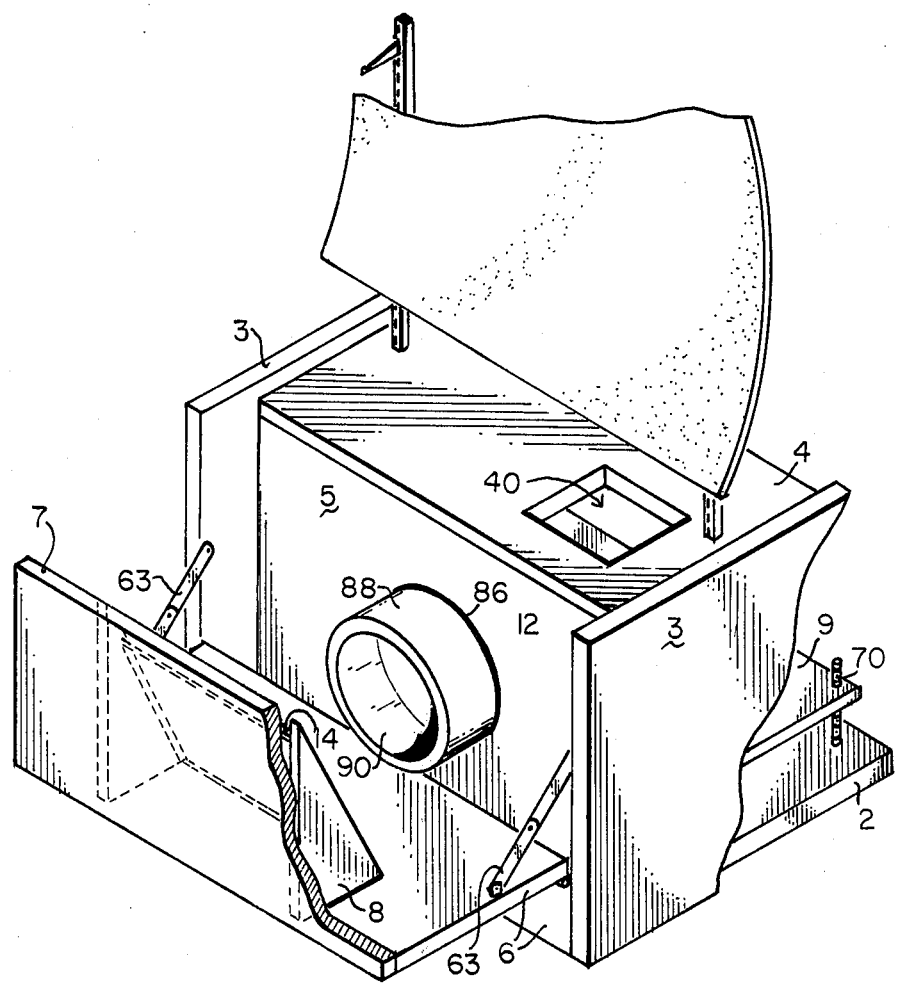
FIG. 1 is a perspective view of a knock down projection television cabinet in accordance with the present invention.

Referring to the perspective view of FIG. 1, a knock down projection television cabinet in accordance with the present invention includes a base panel member 2, a pair of opposing side panel members 3, a top panel member 4, a front panel member 5, a hinged panel member 6, a drawer front panel member 7, a pair of mirror supports panel members 8, and a support panel member 9. Also included as part of the cabinet structure are lens assembly 12, mirror 14, screen supports 16, and a projection screen 18.

Each of the panel members is flat and, with the exception of the mirror support panel members, rectangular in shape. Each panel member is provided with one half of a knock down type fastener pair which allows it to be removably coupled to an adjoining panel member. Referring briefly to FIG. 11 one type of knock down fastener will be described to facilitate the description of the present invention, although it should be realized that other types of removably engagable fasteners could also be used.

In FIG. 11 a knock down fastener pair 19 is shown to include a male fastener 20 and a female fastener 22. The male fastener includes a threaded portion 24 and a pair of head portions 26 and 28 separated by a narrow shank. Head portion 26 is preferably slotted or otherwise configured to accept the tip of a screwdriver.

The female fastener is a plateau shaped bracket having an elongated slot formed on its upper surface 30. As indicated at 20', the male fastener can slide in and out of the slot to respectively engage and disengage the female fastener.

Figure 2:
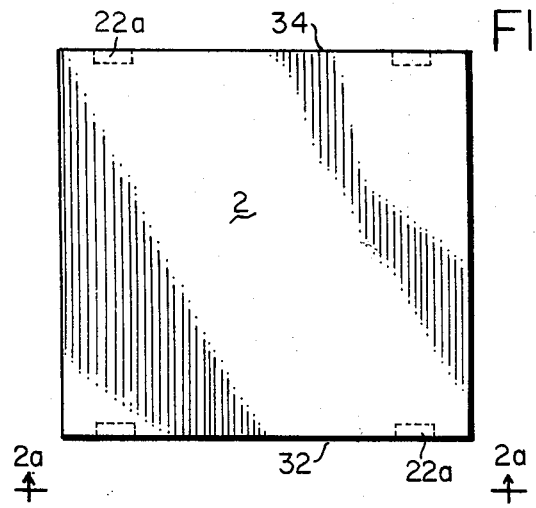
FIG. 2 is a plan view of the base panel member as shown at 2 in FIG. 1.
Figure 2A:
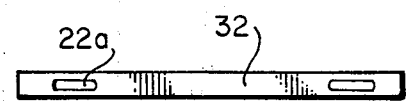
FIG. 2a is a view taken along line 2a—2a of FIG. 2.

Referring not to FIGS. 2 and 2a the base panel member 2 can be seen to be a thin, rectangular panel having female fasteners 22a recessed into its left edge 32 and its right edge 34. As will be discussed subsequently, these female fasteners will slidingly engage male fasteners of adjoining panels.

Figure 3:
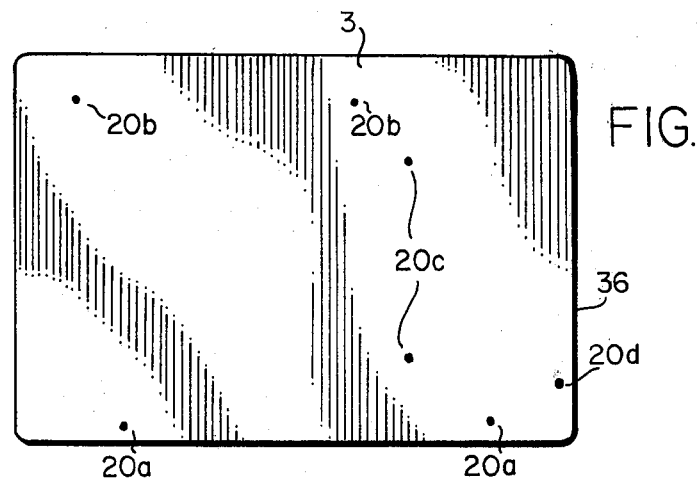
FIG. 3 is an elevational view of one of the side panel members shown at 3 in FIG. 1.

In FIG. 3 the right side panel member 3 is shown, the left side panel member being a mirror image thereof. In this figure we are viewing the inside surface of the panel member with the front edge 36 of the panel member facing to the right. The inner surface of the side panel members is provided with a number of male fasteners referenced by numerals 20a-20d. The two male fasteners 20a of the right side panel member removably engage the two female fasteners 22a along right edge 34 of base panel member 2. Likewise, two male fasteners of the left side panel member removably engage the two female fasteners 22a along left side edge 32 of the base panel member.

Figure 4:
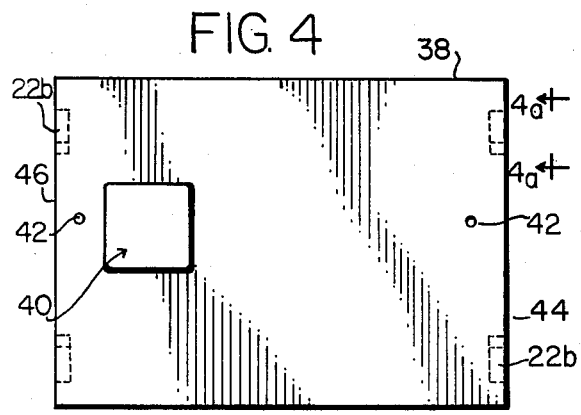
FIG. 4 is a plan view of the top panel member shown at 4 in FIG. 1.

In FIG. 4 the upper surface of top panel member is shown with the front edge 38 thereof facing upwardly. An aperture 40 is cut out of the panel member. A pair of threaded bores 42 are provided in the upper surface and a number of female fasteners 22b are recessed into the left edge 44 and right edge 46 of the panel member. The female fasteners 22b engage male fasteners 20b of the side panel members.

Figure 4A:
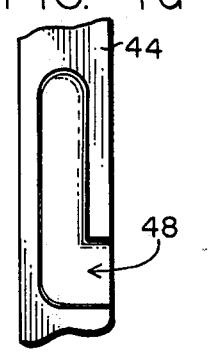
FIG. 4a is a partial view taken along line 4a—4a of FIG. 4.

In FIG. 4a it can be seen that the female fasteners 22b reside within a cut out slot 48. As will be discussed later the cut out facilitates in the assembly of the cabinet.

FIG. 5 is an elevational view of front panel member 5. The panel member is provided with a large circular hole 50 for supporting the aforementioned lens assembly 12. Left and right edges are provided with female fasteners 22c to engage the male fasteners 20c of the side panel members. As indicated in broken lines, the female fasteners 22c reside within cut away recesses similar to the cut away recess shown in FIG. 4a.

In FIGS. 6 and 6a the hinged panel member can be seen to include a supporting lower sub-panel 56 and an upper sub-panel 58 connected together by a piano hinge 60. Lower sub-panel 56 is provided with female fasteners 22d which can engage with male fasteners 20d of the side panels. As seen in FIG. 6a, the bottom edge of the lower sub-panel is grooved so as to fit in front of the front edge of base panel member 2.

The upper sub-panel member 58 is provided with a pair of female fasteners 22e along its upper edge. A pair of circular fasteners 62 are recessed into the far surface of the upper sub-panel member.

In FIG. 7 the drawer front panel member is shown to be a rectangular panel provided with male fasteners 20e and 20f. Male fasteners 20e can engage with female fasteners 22e so that the upper sub-panel member 58 and the drawer front panel member together define a right angle hinged door (as seen in FIG. 1). This right angle drawer can be swung up to cover the front panel member and protect the lens assembly and mirror. A pair of drawer stays 63 keeps the drawer from opening too far.

FIGS. 8 and 8a illustrates the left mirror support panel member, the right mirror support panel member being a mirror image thereof. The mirror support panel members are generally right triangular in shape and include an elongated groove 64 proximate its hypotenuse edge receptive to an edge of the mirror. The mirror support panels also include female fasteners 22f which can engage male fasteners 20f of the drawer front panel member, and another knock down type fastener 66 which can engage the circular fasteners 62 of the upper sub-panel member 58.

Support panel member 9, as illustrated in FIG. 9, is a rectangular panel provided with four holes 68 proximate its four corners. These holes accept threaded studs extending upwardly from base panel member 2, such as the threaded stud 70 shown in FIG. 1. By placing a nut on the studs 70 below the support panel member the height of the support panel member above the base panel member can be adjusted.

In FIG. 10 one of the two screen supports is shown in broken perspective view. The screen supports include an elongated column 72 provided with a threaded stud 74 at its lower end which screw into the threaded bores 42 of the top panel member. The columns are further provided with a vertically aligned series of slots 76.

A bracket 78 engages a pair of consecutive slots 76. A nut 80 and bolt 82 arrangement attaches a projecting tab 84 of the screen to the brackets. The height of the screen can be adjusted by varying the height of the brackets 78 on columns 72 and the angle of the screen can be adjusted by loosening nuts 80, repositioning the screen, and then retightening nuts 80.

With reference to FIG. 1, the lens assembly 12 of this preferred embodiment is a two part structure including a collar portion 86 attached through the front panel member, and a tubular structure 88 slidably disposed within the collar portion. A fresnel lens 90 is positioned near the front of the tubular structure and a similar fresnel lens (not shown) is positioned near the rear of the tubular structure.

The mirror 14 is preferably standard flat, glass mirror either of the front reflecting or the rear reflecting type. A rear reflecting mirror is probably preferable since the mirror surface is protected from harm, but a front reflecting mirror might be used if reflection losses are to be minimized.

The projection screen can be any of the many commercially available types. The preferred embodiment described herein presently uses a four foot diagonal screen, but may be easily modified for a five foot diagonal screen by simply moving the screen supports back.

Assembly of the knock down projection television cabinet can be accomplished as follows: (1) place the base panel member on the floor. Add casters (not shown) to the bottom of the base, if desired; (2) slide the male fasteners 20a of the side panel members into the female fasteners 22a of the base; (3) slide the female fasteners 22c of the front panel member onto the male fasteners 20c of the side panel members. Attach collar 86 through hole 50 of the front panel member; (4) slide the female fasteners 22b of the top panel members members onto the male fasteners 20b of the side panel members; (5) slide the female fasteners 22d of the lower sub-panel section onto the male fasteners 20d of the side panel members; (6) slide the male fasteners 20e of the drawer front panel member into the female fasteners 22e of the upper sub-panel member; (7) slide female fasteners 22f of the mirror supports onto the male fasteners 20f of the drawer front panel member; (8) engage fasteners 66 of the mirror supports with circular fasteners 62 of the upper sub panel member; (9) attach the drawer stays 63; (10) screw the screen support columns 72 into the threaded bores 42 of the top panel member; (11) attach brackets 78 to the screen support columns; (12) attach the screen to the brackets; and (13) slide the tubular lens support 88 into the collar 86.

In use, an image source such as a 13 inch portable television set is placed upon a properly adjusted support panel member 9. The drawer is opened and the lens assembly and projection screen adjusted, if necessary. If the television is not a remote control type its controls can be accessed through aperture 40.

Disassembly of the knock down projection television cabinet can be accomplished by reversing the assembly procedure. With the exception of the lens assembly all of the component members of the cabinet can be stored and shipped in a compact, flat form.

While this invention has been described in terms of a few preferred embodiments, it is contemplated that persons reading the preceding descriptions and studying the drawing will realize various alterations, permutations and modifications thereof. It is therefore intended that the following appended claims be interpreted as including all such alterations, permutations and modifications as fall within the true spirit and scope of the present invention.

What is claimed is:

1. A knock down projection television cabinet comprising:

a plurality of planar panel members provided with knock down fastener pairs of the type including a first fastener and a second fastener removably engagable with said first fastener, said panel members being assemblable into an enclosure having a hinged front drawer and being disassemblable for flat, compact storage and shipment, the panel members including a base panel member having opposing left and right side edges, said opposing edges of said base panel member each being provided with at least one of said first fasteners, a support panel member and attachment means for attaching said support panel member to an upper surface of said base panel member, whereby a television image source may be supported upon said support panel, a front panel member provided with a centrally located aperture and having opposing left and right edges, said opposing edges of said front panel member each being provided with at least one of said first fasteners, a hinged panel member having opposing left and right edges and a top edge, said opposing edges of said hinged panel member and said top edge being provided with at least one of said first fasteners, said hinged panel member including a lower sub-panel, an upper sub-panel, and hinge means attaching said upper sub-panel and said lower sub-panel together, said lower sub-panel being attached to said left side panel and said right side panel, and said upper sub-panel being attached at approximately right angles to said drawer front panel, a top panel member having opposing left and right edges, each of said opposing edges of said top panel member being provided with one of said first fasteners, a left side panel member having an inner surface provided with a plurality of said second fasteners for removably engaging said first fasteners of said left edges of said base panel member, said front panel member, said top panel member, and said hinged panel member, a right side panel member having an inner surface provided with a plurality of said second fasteners for removably engaging said first fasteners of said right edges of said base panel member, said front panel member, said top panel member, and said hinged panel member, and a drawer front panel member having an inner surface provided with a plurality of said second fasteners for engaging said first fastener of said top edge of said hinged panel member;

a lens assembly disposed through said aperture in said front panel;

mirror means removably attached to at least one of said hinged panel member and said drawer front panel member;

a projection screen; and screen support means removably attached to said top panel member and to said projection screen.

2. A knock down projection television cabinet as claimed in claim 1 wherein said mirror means includes a pair of mirror support panel members each having an edge provided with at least one of said first fasteners for engaging one of said second fasteners of said drawer front panel member, and a mirror supported between said mirror support panel members.

3. A knock down projection television cabinet as claimed in claim 2 wherein said top panel member is provided with an aperture sufficiently large to pass the hand and arm of a person wishing to adjust said television image source.

4. A knock down projection television cabinet as claimed in claim 3 wherein said attachment means is adjustable to allow the distance between said support panel member and said base panel member to be varied.

5. A knock down projection television cabinet as claimed in claim 4 wherein said lens assembly includes a collar portion attached to said centrally located aperture of said front panel member, a tubular portion slidably disposed within said collar portion, and a lens positioned within said tubular portion.

6. A knock down projection television cabinet as claimed in claim 5 wherein said screen support means includes a pair of support columns removably attached to said top panel member, and a pair of brackets each having a first end removably attachable to one of said support columns and a second end removably attachable to said projection screen.

7. A knock down projection television cabinet comprising:
   a plurality of planar panel members provided with knock down fastener pairs of the type including a first fastener and a second fastener removably engagable with said first fastener, said panel members being assemblable into an enclosure having a hinged front drawer and being disassemblable for flat, compact storage and shipment, the panel members including
   a base panel member having opposing left and right side edges, said opposing edges of said base panel member each being provided with at least one of said first fasteners,
   a support panel member and attachment means for attaching said support panel member to an upper surface of said base panel member, whereby a television image source may be supported upon said support panel,
   a front panel member provided with a centrally located aperture and having opposing left and right edges, said opposing edges of said front panel member each being provided with at least one of said first fasteners
   a hinged panel member having opposing left and right edges and a top edge, said opposing edges of said hinged panel member and said top edge being provided with at least one of said first fasteners,
   a top panel member having opposing left and right edges, each of said opposing edges of said top panel member being provided with one of said first fasteners,
   a left side panel member having an inner surface provided with a plurality of said second fasteners for removably engaging said first fasteners of said left edges of said base panel member, said front panel member, said top panel member, and said hinged panel member,
   a right side panel member having an inner surface provided with a plurality of said second fasteners for removably engaging said first fasteners of said right edges of said base panel member, said front panel member, said top panel member, and said hinged panel member, and
   a drawer front panel member having an inner surface provided with a plurality of said second fasteners for engaging said first fastener of said top edge of said hinged panel member;
   a lens assembly disposed through said aperture in said front panel;
   mirror means removably attached to at least one of said hinged panel member and said drawer front panel member;
   a projection screen; and
   screen support means removably attached to said top panel member and to said projection screen.

8. A knock down projection television cabinet as claimed in claim 7 wherein said mirror means includes a pair of mirror support panel members each having an edge provided with at least one of said first fasteners for engaging one of said second fasteners of said drawer front panel member, and a mirror supported between said mirror support panel members.

9. A knock down projection television cabinet as claimed in claim 7 wherein said top panel member is provided with an aperture sufficiently large to pass the hand and arm of a person wishing to adjust said television image source.

10. A knock down projection television cabinet as claimed in claim 7 wherein said attachment means is adjustable to allow the distance between said support panel member and said base panel member to be varied.

11. A knock down projection television cabinet as claimed in claim 7 wherein said lens assembly includes a collar portion attached to said centrally located aperture of said front panel member, a tubular portion slidably disposed within said collar portion, and a lens positioned within said tubular portion.

12. A knock down projection television cabinet as claimed in claim 7 wherein said screen support means includes a pair of support columns removably attached to said top panel member, and a pair of brackets each having a first end removably attachable to one of said support columns and a second end removably attachable to said projection screen.

* * * * *